No. 800,752. PATENTED OCT. 3, 1905.
D. A. MESSNER.
SELF LOCKING CLUTCH.
APPLICATION FILED MAY 16, 1904.
2 SHEETS—SHEET 1.
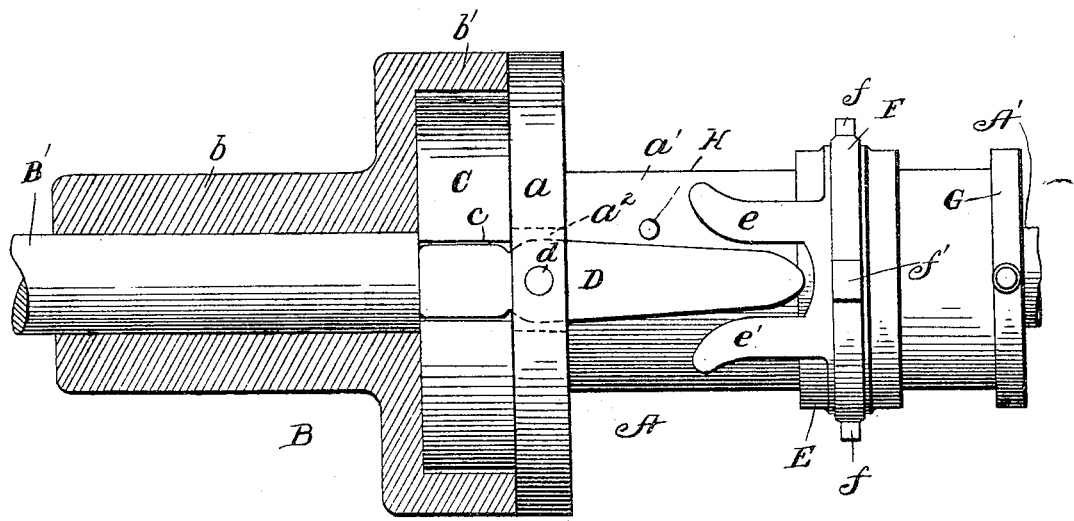
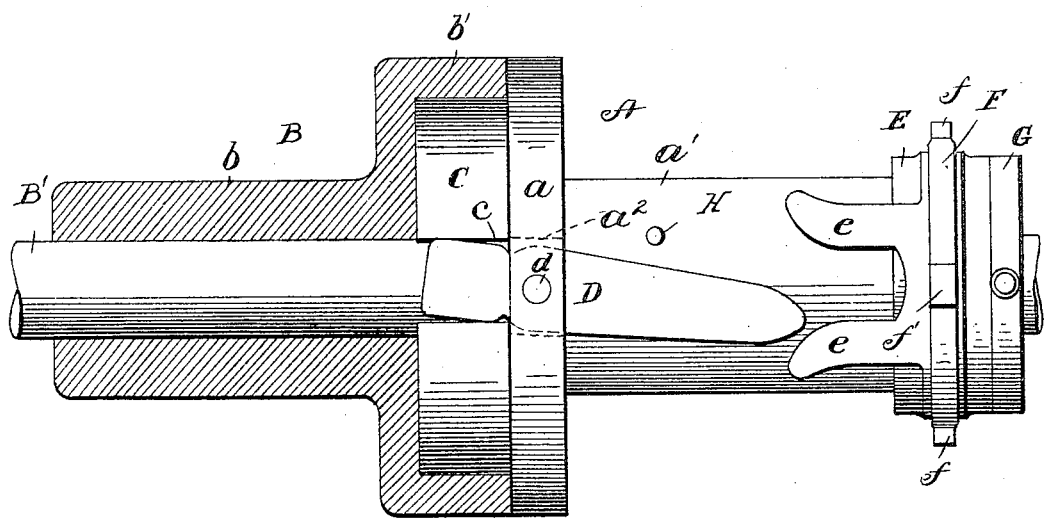
Witnesses
M. E. Moore
C. C. Clements
David A. Messner.
Inventor
by Wm. N. Moore
Attorney

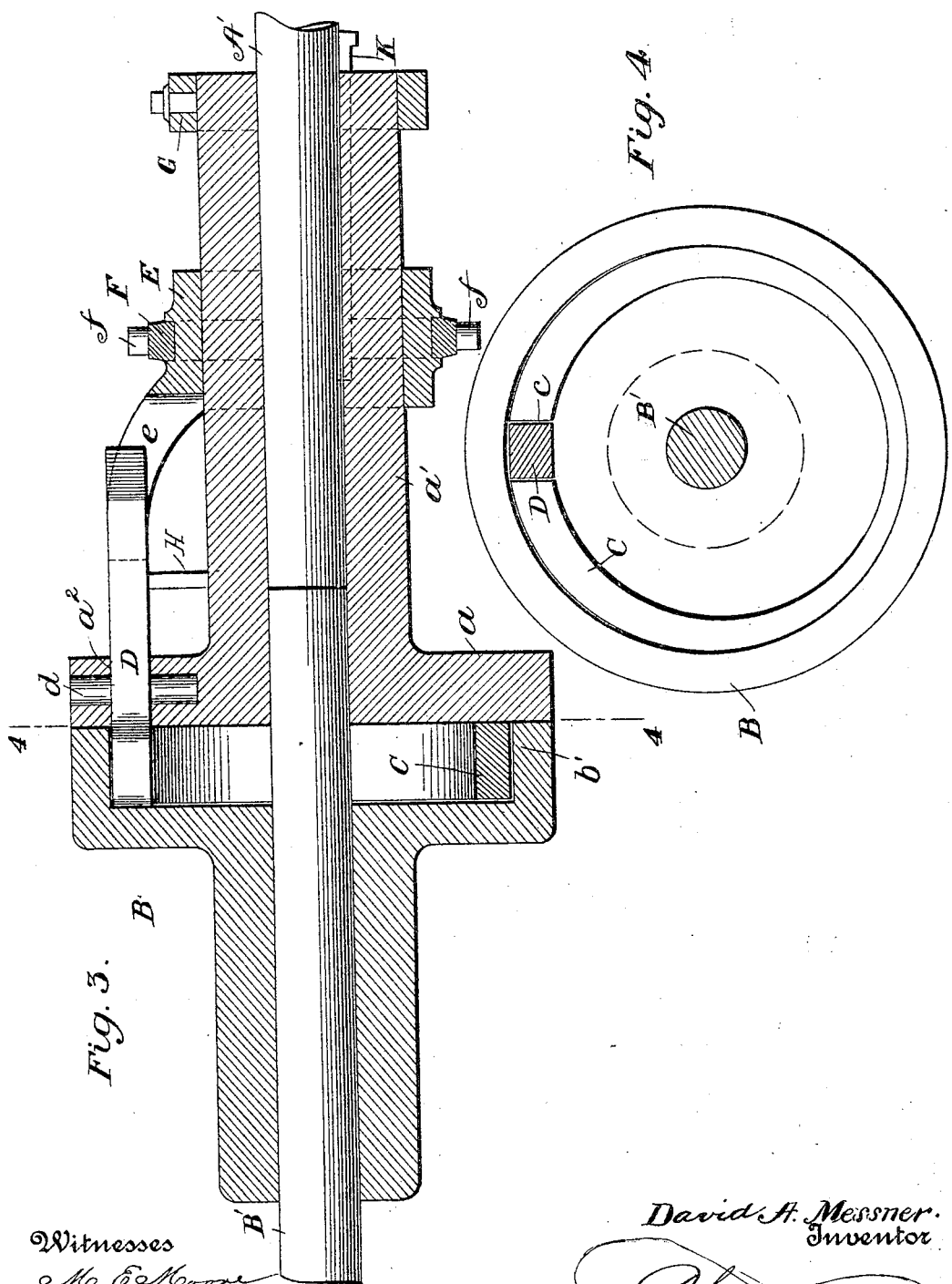

UNITED STATES PATENT OFFICE.

DAVID A. MESSNER, OF AKRON, OHIO.

SELF-LOCKING CLUTCH.

No. 800,752.　　　　Specification of Letters Patent.　　　　Patented Oct. 3, 1905.

Application filed May 16, 1904. Serial No. 208,289.

*To all whom it may concern:*

Be it known that I, DAVID A. MESSNER, a citizen of the United States, residing at Akron, in the county of Summit and State of Ohio, have invented certain new and useful Improvements in Self-Locking Clutches, of which the following is a specification.

My invention relates to improvements in self-locking clutches; and some of the objects accomplished thereby are locking of the clutch automatically, adaptability to varying loads, no adjustment required, grip of clutch increases with increase in load, and clutch may be employed as a coupling for line-shafting, so that any part of the shop may be cut out by movement of the shifting-sleeve forming part of this invention. Bolts and nuts are done away with, and when the clutch is thrown open all friction is removed and there is no pounding or rattling of its parts.

With these and other objects and advantages in view the invention consists in certain novel and useful combinations and arrangements of parts, as set forth in the following description and particularly pointed out in the appended claims, forming part of this specification.

In the drawings accompanying this specification and illustrating the invention, Figure 1 is a top plan view of the clutch, showing the driven pulley in section. Fig. 2 is a similar view showing the clutch in operative position. Fig. 3 is a vertical longitudinal sectional view, and Fig. 4 is a transverse sectional view on the line 4 4 of Fig. 3.

Like letters of reference denote like parts in the several views of the drawings.

The driving-pulley A is mounted upon shaft A' and keyed thereon, as at K, and said pulley consists of a disk $a$, formed integral with an extended hub or sleeve $a'$. Mounted upon a shaft-section B', alined with shaft A' or may be upon the same shaft with pulley A, is the driven pulley B, which comprises the hub $b$ and the flanged part $b''$. Within the flange which is annular is located a divided annulus or ring C, preferably made of soft steel or other suitable material, and said annulus gradually diminishes in thickness from the division $c$ therein to a point diametrically opposite. Within an opening $a^2$ in the pulley A, registering with this opening in the annulus C, a lever D is pivotally mounted and held in place by the pivot-pin $d$. One end of the lever projects into the opening $c$ between the ends of the annulus C, while the other end is tapered and projects into the space between two jaws $e\ e'$, formed upon a slidable sleeve E, mounted upon the hub $a'$. The jaws of this sleeve are in alinement with the opening $a^2$ in the disk $a$ and the opening $c$ between the ends of the annulus C. This sleeve E carries a ring F, provided with spurs or projections $f\ f'$, by means of which it may be moved back and forth upon the hub $a'$ for a purpose to be explained. Backward movement of the sleeve is limited by a collar G, secured to the end of the hub $a'$.

When the sleeve is in the position shown in Fig. 1, the lever is maintained in an approximately straight line with reference to the ends of the annulus C, and said annulus being of less diameter than the interior of the flanged pulley B runs idly within the same when driving-pulley A revolves; but when the sleeve is in the position shown in Fig. 2 the lever D assumes the position shown, when the pulley A revolves and forces the ends of the annulus C apart, and as its diameter increases it binds tightly against the inner surface of the flange upon the driven pulley and carries the latter around with the driving-pulley and at the same speed. The greater the load upon the driven pulley the tighter the lever D causes the annulus C to bind within the flange.

By employing this device upon the meeting ends of shafting to be coupled it will be readily seen that a coupling-joint is secured in a very simple and efficient manner.

The pin or stop H, located on the hub or sleeve $a'$, acts as a means for locking or unlocking the parts connected to lever D. By placing the pin or stop H at one side of the operating-lever D said lever is made self locking or unlocking, thereby preventing any of the machinery driven by my mechanism from being reversed in case of a reversal of the motive power. This is a very important feature in connection with machinery likely to turn backward under some circumstances—such as sewing-machines, looms, printing-machines, &c.—and is particularly applicable to gas-engines. In use with a gas-engine when my device is present should the flame in the ignition-tube go out, the engine fail to ignite and run against a compressed charge, and thus be reversed in its movement, the stop H will prevent a reverse movement of the shaft.

Having thus fully described my invention, what I claim as new, and desire to secure by Letters Patent of the United States, is—

1. The combination with a shaft and a driving-pulley adapted to rotate therewith, of a second shaft having a driven pulley mounted thereon, an expansible divided ring carried by said driven pulley and adapted to be expanded into frictional engagement therewith; a pivoted lever carried by said driving-pulley and adapted to expand said ring by forcing the ends thereof apart; and a slidable sleeve provided with jaws adapted to engage with the free end of the lever and maintain it in an inoperative position.

2. In a clutch mechanism the combination with a driving shaft and pulley, of a driven shaft and pulley, a divided ring carried by the driven pulley, a lever pivoted in the driving-pulley having one end adapted to engage said ring, a pair of jaws adapted to engage said lever to prevent expansion of said ring by said lever as described, and a projection on the driving-pulley to engage said lever to prevent actuation of the clutch upon a reverse movement of the driving-pulley.

3. In a clutch mechanism the combination with a driving shaft and pulley thereon of a driven shaft with a pulley thereon, an elastic ring within the driven pulley, a pivoted lever on the driving-pulley adapted to expand said ring, a sliding sleeve on the driving-pulley having jaws to engage with the free end of said lever, and a projection on the driving-pulley in path of movement of the lever to prevent rotation of the clutch in event of a reversal of the driving-pulley.

In testimony whereof I affix my signature in presence of two witnesses.

DAVID A. MESSNER.

Witnesses:
SARAH E. MESSNER,
LEWIS D. SLUSSER.